United States Patent
Black et al.

(10) Patent No.: US 6,494,305 B1
(45) Date of Patent: Dec. 17, 2002

(54) CARCASS-TRACKING APPARATUS HOUSING CARCASS-TRACKING APPARATUS AND CARCASS-TRACKING METHODS

(75) Inventors: Donald L. Black, Erie, CO (US); Ross S. Dando, Nampa, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/212,181

(22) Filed: Dec. 14, 1998

(51) Int. Cl.7 .............................................. B65G 37/00
(52) U.S. Cl. ...................................................... 198/349
(58) Field of Search ............................. 198/347–349.9; 340/572.8, 573.3

(56) References Cited

U.S. PATENT DOCUMENTS

| | | | | |
|---|---|---|---|---|
| D272,667 S | * | 2/1984 | Kazara | D30/43 |
| 4,597,495 A | * | 7/1986 | Knosby | 104/88.03 |
| 5,014,040 A | * | 5/1991 | Weaver et al. | 340/539 |
| 5,054,170 A | * | 10/1991 | Otrusina | 224/197 |
| 5,433,096 A | * | 7/1995 | Janssen et al. | 70/278.3 |
| 5,441,158 A | * | 8/1995 | Skinner | 198/370.03 |
| 5,552,790 A | * | 9/1996 | Gunnarsson | 342/42 |
| 5,620,120 A | * | 4/1997 | Tien | 224/194 |
| 5,781,112 A | | 7/1998 | Shymko et al. | 340/572 |
| 5,799,769 A | * | 9/1998 | Heer et al. | 198/349 |
| 5,883,576 A | * | 3/1999 | De La Huerga | 340/539 |
| 5,891,156 A | * | 4/1999 | Gessner et al. | 24/327 |
| 6,025,784 A | * | 2/2000 | Mish | 340/693.5 |
| D424,962 S | * | 5/2000 | Dawn | D10/121 |
| 6,059,156 A | * | 5/2000 | Lehtinen | 224/197 |
| 6,130,602 A | * | 10/2000 | O'Toole et al. | 340/10.33 |
| 6,191,691 B1 | * | 2/2001 | Serrault | 177/145 |
| 6,205,929 B1 | * | 3/2001 | Van Dyke et al. | 104/115 |
| 6,231,435 B1 | * | 5/2001 | Pilger | 452/157 |
| 6,296,190 B1 | * | 10/2001 | Rendleman | 235/487 |
| 6,308,542 B1 | * | 10/2001 | Bolton | 70/278.3 |
| 6,329,920 B1 | * | 12/2001 | Morrison et al. | 235/472.02 |

OTHER PUBLICATIONS

Webster's Ninth New Collegiate Dictionary, ©1983 by Merriam–Webster Inc., p. 853 only.

* cited by examiner

*Primary Examiner*—Christopher P. Ellis
*Assistant Examiner*—Richard Ridley
(74) *Attorney, Agent, or Firm*—Wells St. John P.S.

(57) ABSTRACT

Carcass-tracking apparatus housings, carcass-tracking apparatus, and carcass-tracking methods are described. In one embodiment, a carcass-tracking apparatus housing is provided comprising an enclosure dimensioned to contain a transponder and having first and second oppositely-facing surface areas. The first surface area is positioned for mounting against a surface of a carcass-transporting device. The first and second surface areas are preferably different from one another. In another embodiment, the housing comprises an enclosure dimensioned to contain a transponder and having a plurality of surfaces which face in different directions. One of the surfaces is positioned for mounting on a carcass-transporting device. At least two other surfaces have openings therein which are joined with a transponder-receiving space. The openings are preferably sized and positioned to accommodate wireless communication with a transponder which can be received within the transponder-receiving space. Other embodiments are described.

35 Claims, 4 Drawing Sheets

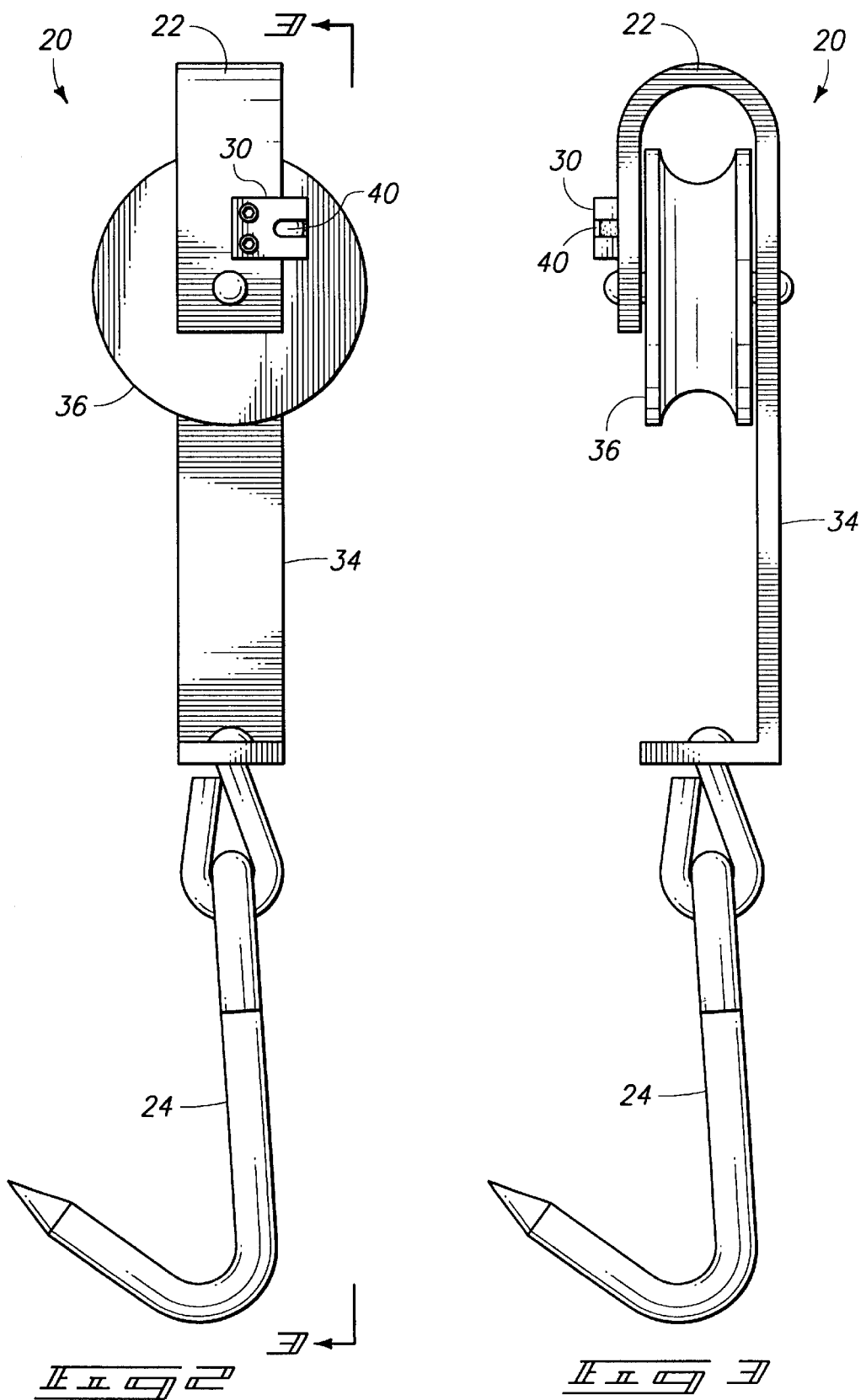

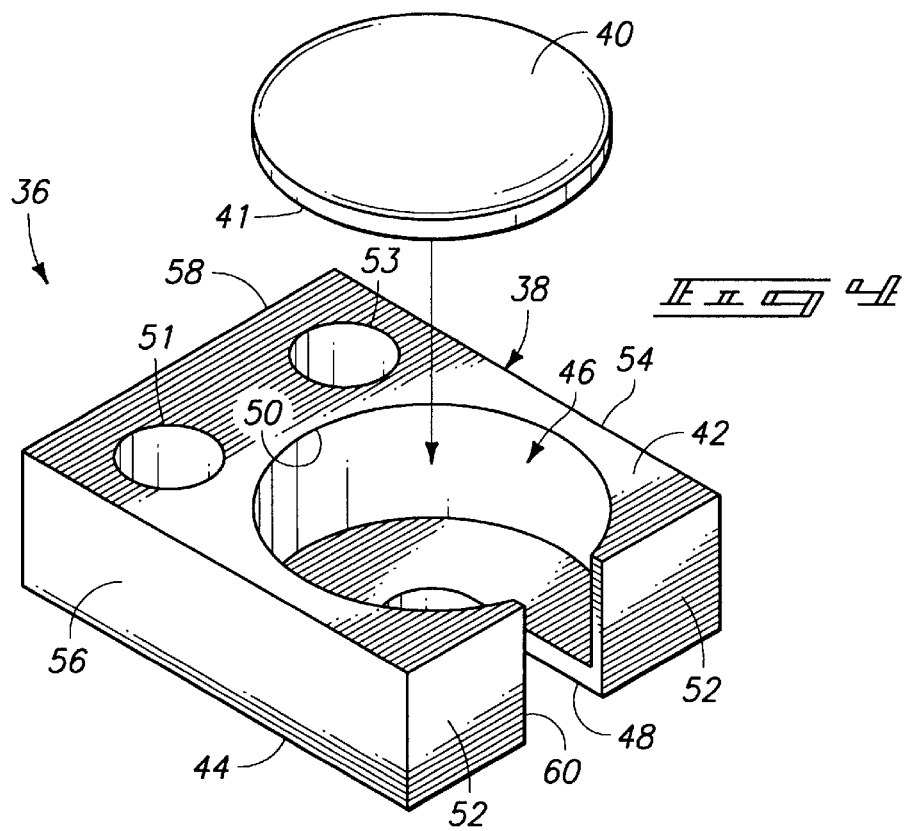
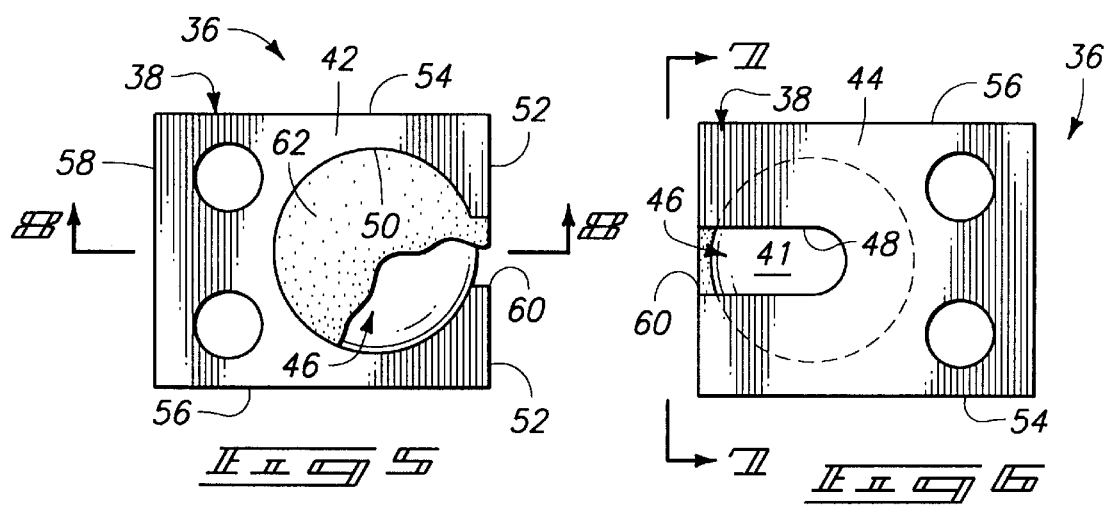
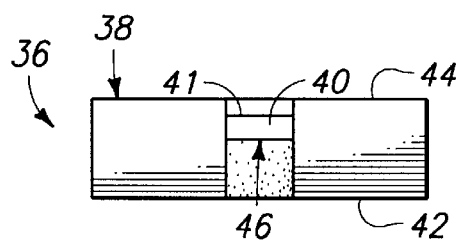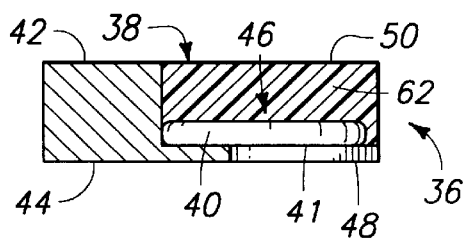

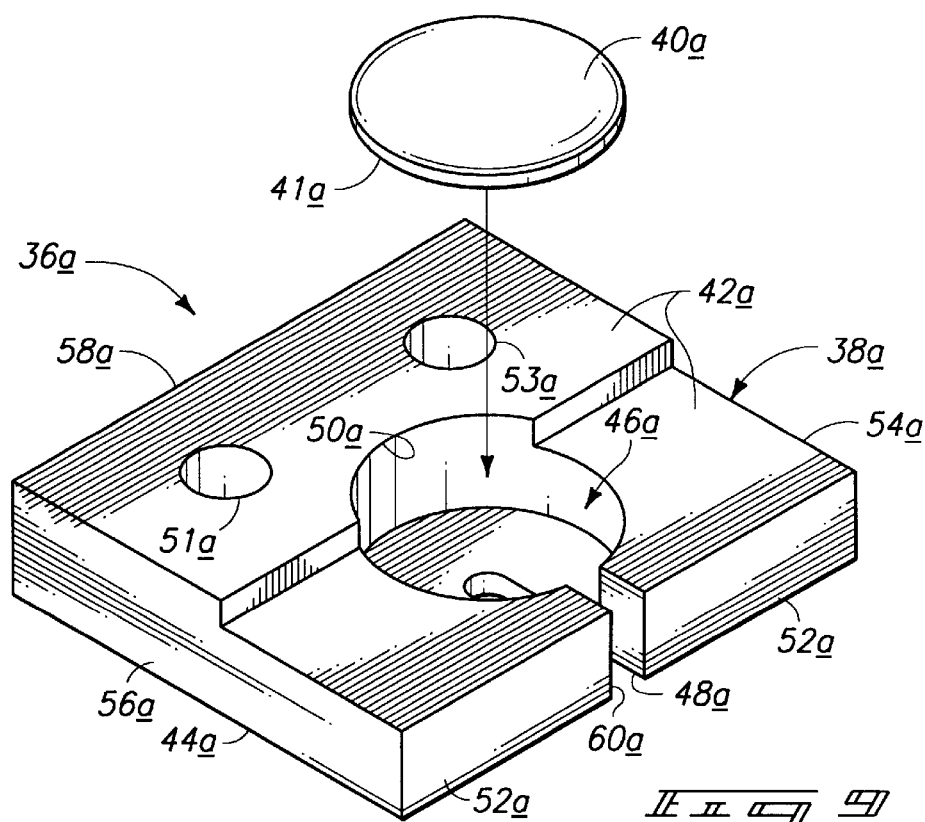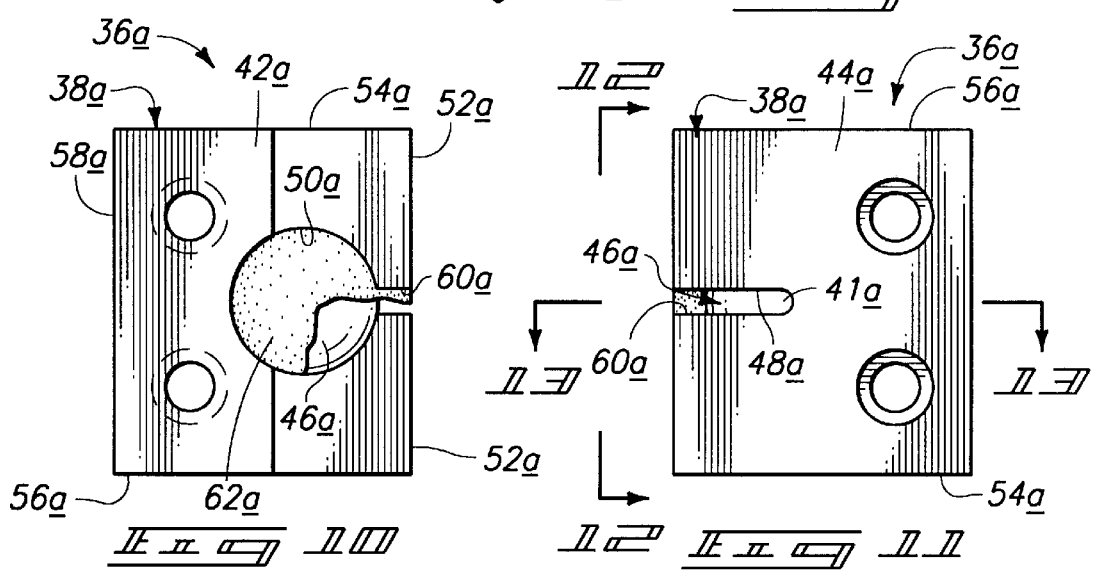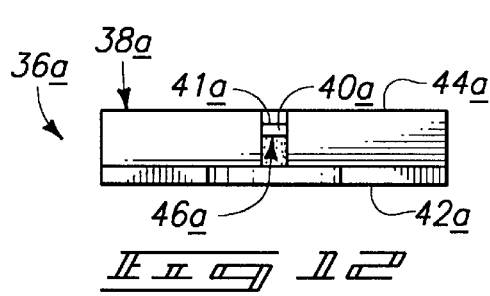

CARCASS-TRACKING APPARATUS HOUSING CARCASS-TRACKING APPARATUS AND CARCASS-TRACKING METHODS

TECHNICAL FIELD

This invention relates to carcass-tracking apparatus housings, to carcass-tracking apparatus, and to carcass-tracking methods.

BACKGROUND OF THE INVENTION

In a meat processing plant, carcasses are typically transported throughout the plant on metal hooks called trolleys or gams. It is very important to identify particular trolleys and associate them with the attached carcass to provide a processing history of the animal, as well as historical data pertaining to immunizations and hormone injections. Furthermore, yield quality as well as required FDA documentation is becoming a very important feature in the food processing industry.

Yet, identification of individual trolleys continues to be a challenge. Specifically, a primary obstacle is the environment within which the trolley is used. Specifically, carcasses weighing up to 1,500 pounds are transported throughout the plant. Accordingly, a suitably-sized trolley must be substantial in size and weight. These trolleys are often handled like most large industrial items in that they are thrown around and bump into one another often. Additionally, the trolleys can be thrown into a bath of caustic solution for sterilization and then dipped in oil to prevent rust. Typically, the lifetime of a trolley can be up to 20 years.

The harsh environment in which these trolleys are used precludes the use of bar codes because they would be destroyed during the normal operations. Even periodic replacement of bar codes is not practical due to the replacements costs. Additionally, blood and animal tissue often obliterates the bar code rendering reading thereof difficult if not impossible.

Current state of the art trolley identification consists typically of drilling a specific hole pattern in the metal shank of a trolley. Each trolley has a particularly unique hole pattern. Light is shone through the holes in the shank and a pattern recognition device is placed on the opposite side of the trolley. This device is designed to recognize unique light patterns and associate them with a particular trolley. Again, blood and animal tissue often blocks the hole pattern in the trolleys thereby causing misreads and erroneous reading of the trolley. A system of forcing air through the holes in the trolley has improved, somewhat, the reading accuracy. However, such system is cumbersome, unreliable, and still does not clear up the misreading problems. Additionally, drilling holes in the shank of a trolley can compromise the structural integrity of the trolley and diminish its useful lifetime.

Accordingly, this invention arose out of needs associated with providing improved carcass-tracking apparatus and methods.

SUMMARY OF THE INVENTION

Carcass-tracking apparatus housings, carcass-tracking apparatus, and carcass-tracking methods are described. In one embodiment, a carcass-tracking apparatus housing is provided comprising an enclosure dimensioned to contain a transponder and having first and second oppositely-facing surface areas. The first surface area is positioned for mounting against a surface of a carcass-transporting device. The first and second surface areas are preferably different from one another. In another embodiment, the housing comprises an enclosure dimensioned to contain a transponder and having a plurality of surfaces which face in different directions. One of the surfaces is positioned for mounting on a carcass-transporting device. At least two other surfaces have openings therein which are joined with a transponder-receiving space. The openings are preferably sized and positioned to accommodate wireless communication with a transponder which can be received within the transponder-receiving space. In yet another embodiment, a carcass-tracking apparatus housing comprises an enclosure having a transponder-receiving space dimensioned to receive a transponder. The enclosure has a pair of openings which face in different directions from one another, and the openings are joined with one another through the transponder-receiving space. Preferably, the openings have different shapes. Other embodiments are described.

BRIEF DESCRIPTION OF THE DRAWINGS

Preferred embodiments of the invention are described below with reference to the following accompanying drawings.

FIG. 2 is a side elevational view of a carcass-transporting device in accordance with another embodiment of the invention.

FIG. 3 is a side elevational view of the FIG. 2 carcass-transporting device when viewed from a direction taken along line 3—3.

FIG. 4 is an isometric view of a carcass-tracking apparatus housing in accordance with one embodiment of the present invention.

FIG. 5 is a bottom plan view of the carcass-tracking apparatus housing of FIG. 4.

FIG. 6 is a top plan view of the carcass-tracking apparatus housing of FIG. 4.

FIG. 7 is an end elevational view of the FIG. 4 carcass-tracking apparatus housing when viewed in a direction taken along lines 7—7.

FIG. 8 is a view which is taken along line 8—8 of FIG. 5.

FIG. 9 is an isometric view of a carcass-tracking apparatus housing in accordance with another embodiment of the present invention.

FIG. 10 is a bottom plan view of the FIG. 9 carcass-tracking apparatus housing.

FIG. 11 is a top plan view of the FIG. 9 carcass-tracking apparatus housing.

FIG. 12 is an end elevational view which is taken along line 12—12 of FIG. 11.

FIG. 13 is a sectional view which is taken along line 13—13 in FIG. 10.

DETAILED DESCRIPTION OF THE PREFERRED EMBODIMENTS

Figure 1:
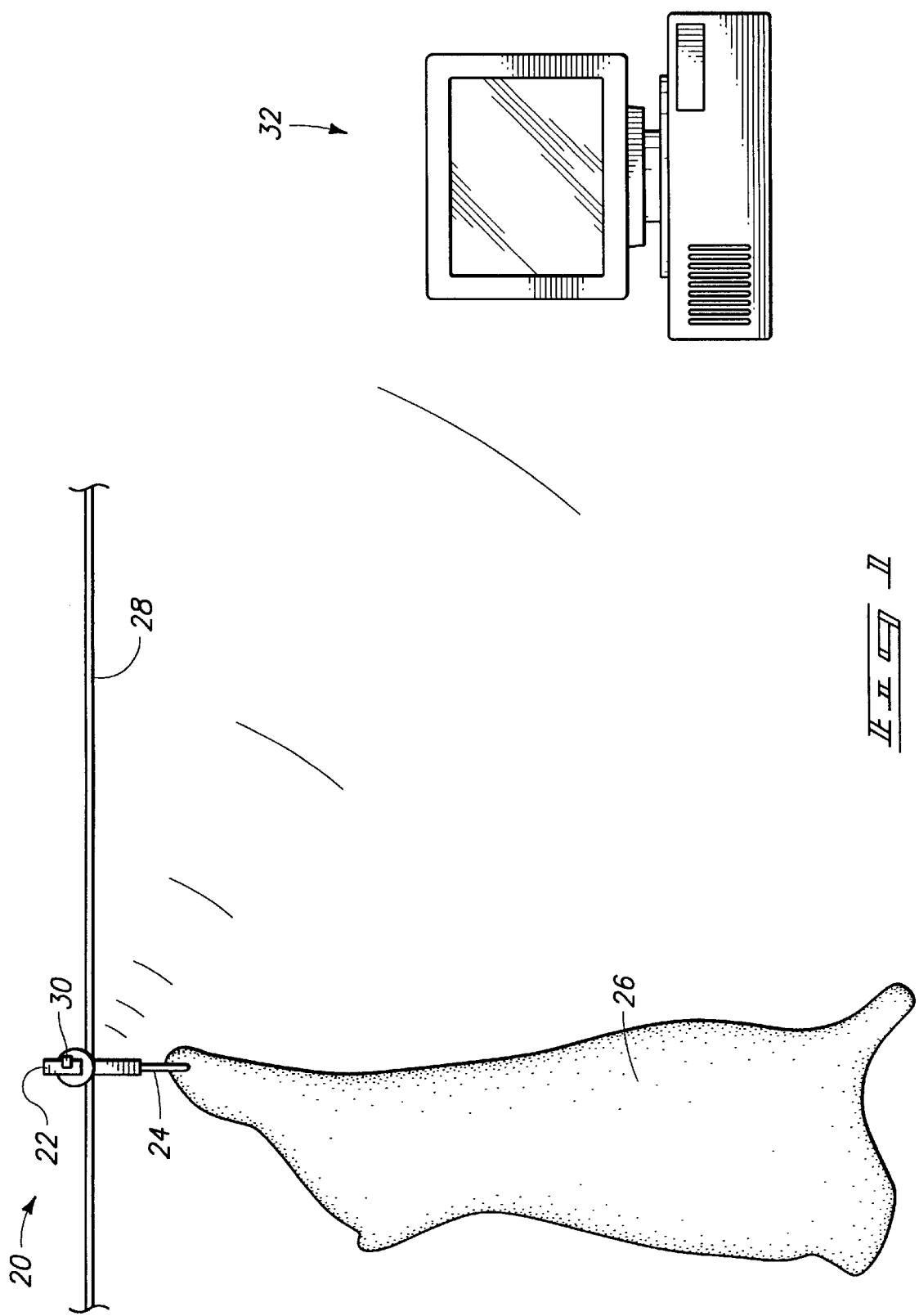
FIG. 1 shows a carcass-transporting device in accordance with one embodiment of the present invention.

This disclosure of the invention is submitted in furtherance of the constitutional purposes of the U.S. Patent Laws "to promote the progress of science and useful arts" (Article 1, Section 8).

Referring to FIG. 1, a carcass-transporting device in accordance with one embodiment of the invention is shown generally at 20 and includes a trolley 22 having a hook 24 connected thereto. A carcass is shown at 26 connected with hook 24. A track 28 is provided along which trolley 22 can be moved from processing station to processing station.

An exemplary carcass-tracking apparatus is shown generally at 30 connected with device 20. In a preferred embodiment, carcass-tracking apparatus 30 is mounted directly on trolley 22 as will become apparent below. The carcass-tracking apparatus 30 can be mounted as by welding, adhering with suitable adhesives, or by mechanically mounting the apparatus to the trolley as with screws or other mounting mechanisms.

Carcass-tracking apparatus 30 preferably includes a transponder which enables wireless communication to be conducted between device 20 and a remote location such as location 32. In the illustrated example, location 32 can comprise a computer or other processor such as an interrogator, which preferably includes suitable transmit and receive circuitry to both transmit signals to carcass-tracking apparatus 30 and to receive signals transmitted from carcass-tracking apparatus 30. In a preferred embodiment, wireless communication takes place through RF transmissions. A suitable device for conducting such RF communication is disclosed in pending U.S. patent application Ser. No. 08/705,043, the disclosure of which is expressly incorporated herein by reference. Of course, other transponders can be used.

Referring to FIGS. 2 and 3, different side elevational views of a carcass-transporting device 20, without the carcass, are shown. Device 20 includes, in this example, a metallic body 34 which supports a trolley wheel 36 as shown. Trolley wheel 36 engages track 28 (FIG. 1) so that the device can be moved therealong.

Referring to FIGS. 4-8, a carcass-tracking apparatus housing in accordance with one embodiment of the invention is shown generally at 36. Housing 36 comprises an enclosure 38 which is dimensioned to contain a transponder 40. In the illustrated example, housing 36 includes a first surface area 42 and a second surface area 44. The first and second surface areas 42, 44, in this example, face oppositely one another as shown. Preferably, the first surface area 42 is positioned for mounting against a surface of a carcass-transporting device, such as that which is shown in FIGS. 2 and 3. In a preferred embodiment, the first and second surface areas are different in dimension from one another. In one embodiment, second surface area 44 is larger in dimension than first surface area 42. In another embodiment, enclosure 38 contains a transponder-receiving space 46. Second surface area 44 preferably includes an opening 48 therein which is in communication with transponder-receiving space 46. In a preferred embodiment, opening 48 is elongate. In another embodiment, first surface area 42 has an opening 50 which is in communication with transponder-receiving space 46. Preferably, openings 48, 50 are different in shape. In another embodiment, openings 48, 50 are different in size. In the illustrated example, opening 50 is larger in size than and different in shape from opening 48. Apertures 51, 53 can be provided to assist in mounting housing 36 on a carcass-transporting device. Specifically, suitable screws can be provided through the apertures for mounting the housing on a carcass-transporting device.

In another embodiment, enclosure 38 has a plurality of surfaces which face in different directions. For example, first and second surface areas 42, 44 comprise surfaces which face in different directions. Additionally, individual surfaces 52, 54, 56, and 58 are provided. One of the surfaces is preferably positioned for mounting on a carcass-transporting device such as that shown in FIGS. 2 and 3. In this example, surface 42 is mounted directly on the carcass-transporting device with opening 48 facing away from the carcass-transporting device. In this embodiment, at least two other surfaces have openings therein which are joined with transponder-receiving space 46. Specifically, surface 52 has an opening 60 and surface 44 has an opening 48 which are joined with transponder-receiving space 46. The openings are preferably sized and positioned to accommodate wireless communication with the transponder, e.g. transponder 40, which can be received within transponder-receiving space 46. In one embodiment, openings 48, 60 are joined with one another. In one embodiment, at least one of openings 48, 60 is elongate. In another embodiment, openings 48, 60 face in respective directions which are generally 90 degrees away from one another.

In another embodiment, enclosure 38 has a transponder-receiving space 46 dimensioned to receive a transponder, e.g. transponder 40. Enclosure 38 includes a pair of openings which face in different directions from one another. The openings are preferably joined with one another through the transponder-receiving space 46 and have different shapes. In the illustrated example, openings 48 and, 50 face in different directions from one another and are joined with one another through the transponder receiving space 46. The openings preferably have different shapes. In this example, opening 48 is generally elongate in shape and opening 50 is generally circular in shape. Other shapes are, of course, possible.

In one embodiment, openings 48 and 50 lie in planes which are generally parallel with one another and the enclosure includes a sidewall, i.e. corresponding to surface 52 (FIG. 4), which extends generally between the planes. In a preferred embodiment side wall 52 comprises a sidewall opening 60 which extends between and joins with the pair of openings 48, 50.

In another embodiment, a carcass-tracking apparatus includes a transponder package 40 having a surface 41 (FIG. 6). housing 36, in this embodiment, preferably comprises a metallic housing which, for example, can comprise steel. Housing 36 comprises a receiving space 46 which is configured to receive transponder package 40. Housing 36 includes a housing surface 44 having a slot 48 disposed therein. Preferably, slot 48 is in communication with receiving space 46. Transponder package 40 is preferably positioned in receiving space 46 with the transponder package surface 41 facing slot 48 with less than an entirety of the transponder package surface 41 being disposed laterally proximate the slot. Such a configuration is shown best in FIG. 6 which shows only a portion of transponder package surface 41 as being disposed directly laterally proximate the slot.

In one embodiment, slot 48 is generally elongate. In another embodiment, another housing surface, e.g. surface 42, is spaced from surface 44 and includes an opening 50 which is joined with receiving space 46 and dimensioned to accommodate insertion of transponder package 40 into receiving space 46. In another embodiment, slot 48 and opening 50 lie in planes which are generally parallel with one another. In one embodiment, housing 36 comprises a plurality of housing surfaces, i.e. surfaces 42, 44, 52, 54, 56, and 58 which lie in planes which define a parallelepiped. In another embodiment, two other openings, e.g. openings 50, 60, are provided in different respective housing surfaces which are respectively joined with receiving space 46.

In another embodiment, carcass-tracking apparatus 30 (FIGS. 2 and 3) comprises a transponder 40 (FIG. 4) and a metallic enclosure 38 dimensioned to receive transponder 40 within a transponder-receiving space 46. Enclosure 38 preferably includes a plurality of surfaces with at least one of the surfaces having an opening therein operably connected with transponder-receiving space 46 and positioned to accommodate wireless communication with the transponder. Encapsulant material 62 is provided and preferably disposed within transponder-receiving space 46 and covers at least a portion of transponder 40. The transponder is preferably fixedly mounted within the transponder-receiving space 46 by the encapsulant or mounting material 62. Any suitable encapsulant material or mounting material can be used. Preferably, the encapsulant or mounting material projects no further than surface 52 and/or surface 44.

Referring to FIGS. 9–14, an alternate housing in accordance with the invention is shown generally at 36a. Like numerals from the above-described embodiment have been used where appropriate, with differences being indicated with the suffix "a" or with different numerals. In this example, opening 50a is joined with a passageway 64 which can enhance radio frequency transmission.

Advantages of the various described embodiments constitute improvements in the performance and reliability of carcass-tracking apparatus. Specifically, various embodiments of the invention are extremely durable because the transponder is encased in metal. This metal comprises, in various preferred embodiments, a unitary integral housing. Additionally, a substantial portion of the housing faces outward, e.g. surface 44 when mounted on a suitable trolley, such that the transponder is protected from physical shocks due to collisions of the trolleys. In addition, electrical performance of the transponder can be greatly enhanced due to placement of a slot or opening in the transponder housing which enables the transponder to be offset from the trolley metal. In the illustrated examples above, the transponder is offset from the trolley metal and maintained in such a position by the encapsulant or mounting material. In addition, the housing is easily replaceable should the electronics fail or should they become physically damaged due to operational circumstances. The one piece integrated design of the housing, in combination with the transponder unit can greatly facilitate replacement. In addition, mounting of the housing on a trolley is facilitated by the fact that the unit can be welded directly to the trolley which greatly reduces the costs associated therewith.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A carcass-tracking apparatus housing comprising an enclosure dimensioned to contain a transponder and having first and second oppositely-facing surface areas, the first surface area being positioned for mounting against a surface of a carcass-transporting device, wherein the first and second surface areas are different from one another.

2. The carcass-tracking apparatus housing of claim 1, wherein the second surface area is larger in dimension than the first surface area.

3. The carcass-tracking apparatus housing of claim 1, wherein the enclosure contains a transponder-receiving space, and wherein the second surface area has an opening therein in communication with the transponder-receiving space.

4. The carcass-tracking apparatus housing of claim 1, wherein the enclosure contains a transponder-receiving space, and wherein the second surface area has an elongate opening therein in communication with the transponder-receiving space.

5. The carcass-tracking apparatus housing of claim 1, wherein the enclosure contains a transponder-receiving space, and wherein the first and second surface areas have respective openings in communication with the transponder-receiving space.

6. The carcass-tracking apparatus housing of claim 1, wherein the enclosure contains a transponder-receiving space, and wherein the first and second surface areas have respective openings in communication with the transponder-receiving space, said openings being different in shape.

7. The carcass-tracking apparatus housing of claim 1, wherein the enclosure contains a transponder-receiving space, and wherein the first and second surface areas have respective openings in communication with the transponder-receiving space, said openings being different in size.

8. The carcass-tracking apparatus housing of claim 1, wherein the enclosure contains a transponder-receiving space, and wherein the first and second surface areas have respective openings in communication with the transponder-receiving space, said openings being different in shape and size, the second surface area opening being elongate.

9. A carcass-tracking apparatus housing comprising an enclosure dimensioned to contain a transponder and having a plurality of surfaces which face in different directions, one of the surfaces being positioned for mounting on a carcass-transporting device, at least two other surfaces having openings therein which are joined with a transponder-receiving space, the openings being sized and positioned to accommodate wireless communication with a transponder which can be received within the transponder-receiving space.

10. The carcass-tracking apparatus housing of claim 9, wherein the openings in the at least two other surfaces are joined with one another.

11. The carcass-tracking apparatus housing of claim 9, wherein one of the openings in the at least two other surfaces is elongate.

12. The carcass-tracking apparatus housing of claim 9, wherein the openings in the at least two other surfaces are joined with one another, and wherein one of the openings in the at least two other surfaces is elongate.

13. A carcass-tracking apparatus housing comprising an enclosure dimensioned to contain a transponder and having a plurality of surfaces which face in different directions, one of the surfaces being positioned for mounting on a carcass-transporting device, at least two other surfaces having openings therein which are joined with a transponder-receiving space, the openings being sized and positioned to accommodate wireless communication with a transponder which can be received within the transponder-receiving space, wherein the openings in the at least two other surfaces face in respective directions which are generally 90° away from one another.

14. A carcass-tracking apparatus housing comprising an enclosure dimensioned to contain a transponder and having a plurality of surfaces which face in different directions, one of the surfaces being positioned for mounting on a carcass-transporting device, at least two other surfaces having openings therein which are joined with a transponder-receiving space, the openings being sized and positioned to accommodate wireless communication with a transponder which can be received within the transponder-receiving space, wherein:

the openings in the at least two other surfaces are joined with one another; and the openings in the at least two other surfaces face in respective directions which are generally 900 away from one another.

15. A carcass-tracking apparatus housing comprising an enclosure dimensioned to contain a transponder and having a plurality of surfaces which face in different directions, one of the surfaces being positioned for mounting on a carcass-transporting device, at least two other surfaces having openings therein which are joined with a transponder-receiving space, the openings being sized and positioned to accommodate wireless communication with a transponder which can be received within the transponder-receiving space, wherein:

one of the openings in the at least two other surfaces is elongate; and the openings in the at least two other surfaces face in respective directions which are generally 90° away from one another.

16. A carcass-tracking apparatus housing comprising an enclosure dimensioned to contain a transponder and having a plurality of surfaces which face in different directions, one of the surfaces being positioned for mounting on a carcass-transporting device, at least two other surfaces having openings therein which are joined with a transponder-receiving space, the openings being sized and positioned to accommodate wireless communication with a transponder which can be received within the transponder-receiving space, wherein:

the openings in the at least two other surfaces are joined with one another, and wherein one of the openings in the at least two other surfaces is elongate; and the openings in the at least two other surfaces face in respective directions which are generally 90° away from one another.

17. A carcass-tracking apparatus housing comprising an enclosure having a transponder-receiving space dimensioned to receive a transponder, the enclosure having a pair of openings which face in different directions from one another, the openings being joined with one another through the transponder-receiving space and having different shapes.

18. The carcass-tracking apparatus housing of claim 17, wherein one of the openings is generally elongate in shape.

19. A carcass-tracking apparatus housing comprising an enclosure having a transponder-receiving space dimensioned to receive a transponder, the enclosure having a pair of openings which face in different directions from one another, the openings being joined with one another through the transponder-receiving space and having different shapes, wherein one of the openings is generally circular in shape.

20. The carcass-tracking apparatus housing of claim 17, wherein the openings lie in:planes which are generally parallel with one another.

21. The carcass-tracking apparatus housing of claim 17, wherein the openings lie in planes which are generally parallel with one another, and wherein the enclosure comprises a sidewall which extends generally between said planes, and further wherein the sidewall comprises a sidewall opening which extends between and joins with said pair of openings.

22. The carcass-tracking apparatus housing of claim 17, wherein one of the openings is generally elongate in shape, and wherein the openings lie in planes which are generally parallel with one another, and wherein the enclosure comprises a sidewall which extends generally between said planes, and further wherein the sidewall comprises a sidewall opening which extends between and joins with said pair of openings.

23. A carcass-tracking apparatus housing comprising an enclosure having a transponder-receiving space dimensioned to receive a transponder, the enclosure having a pair of openings which face in different directions from one another, the openings being joined with one another through the transponder-receiving space and having different shapes, wherein one of the openings is generally circular in shape, and wherein the openings lie in planes which are generally parallel with one another, and wherein the enclosure comprises a sidewall which extends generally between said planes, and further wherein the sidewall comprises a sidewall opening which extends between and joins with said pair of openings.

24. A carcass-tracking apparatus comprising:

a transponder package having a surface; and a metallic housing comprising a receiving space configured to receive the transponder package, the housing having a housing surface with a slot disposed therein, the slot being in communication with the receiving space, the transponder package being positioned in the receiving space with the transponder package surface facing the slot, less than an entirety of said transponder package surface disposed directly laterally proximate the slot.

25. The carcass-tracking apparatus of claim 24, wherein the slot is generally elongate.

26. A carcass-tracking apparatus comprising:

a transponder package having a surface; and a metallic housing comprising a receiving space configured to receive the transponder package, the housing having a housing surface with a slot disposed therein, the slot being in communication with the receiving space, the transponder package being positioned in the receiving space with the transponder package surface facing the slot, less than an entirety of said transponder package surface disposed directly laterally proximate the slot, wherein the housing comprises another housing surface spaced from the first-mentioned housing surface, the another housing surface having an opening joined with the receiving space and which is dimensioned to accommodate insertion of said transponder package into said receiving space.

27. A carcass-tracking apparatus comprising:

a transponder package having a surface; and a metallic housing comprising a receiving space configured to receive the transponder package, the housing having a housing surface with a slot disposed therein, the slot being in communication with the receiving space, the transponder package being positioned in the receiving space with the transponder package surface facing the slot, less than an entirety of said transponder package surface disposed directly laterally proximate the slot, wherein the housing comprises another housing surface spaced from the first-mentioned housing surface, the another housing surface having an opening joined with the receiving space and which is dimensioned to accommodate insertion of said transponder package into said receiving space, wherein the slot and the opening lie in planes which are generally parallel with one another.

28. The carcass-tracking apparatus of claim 24, wherein the housing comprises a plurality of housing surfaces which lie in planes which define a parallelepiped.

29. A carcass-tracking apparatus comprising:

a transponder package having a surface; and a metallic housing comprising a receiving space configured to receive the transponder package, the housing having a housing surface with a slot disposed therein, the slot being in communication with the receiving space, the transponder package being positioned in the receiving space with the transponder package surface facing the slot, less than an entirety of said transponder package surface disposed directly laterally proximate the slot, wherein the housing comprises a plurality of housing surfaces which lie in planes which define a parallelepiped, and further comprising an opening in another of the housing surfaces joined with the receiving space.

30. A carcass-tracking apparatus comprising:

a transponder package having a surface; and a metallic housing comprising a receiving space configured to receive the transponder package, the housing having a housing surface with a slot disposed therein, the slot being in communication with the receiving space, the transponder package being positioned in the receiving space with the transponder package surface facing the slot, less than an entirety of said transponder package surface disposed directly laterally proximate the slot, wherein the housing comprises a plurality of housing surfaces which lie in planes which define a parallelepiped, and further comprising an opening in another of the housing surfaces joined with the receiving space, said another surface lying in a plane which is parallel with the plane in which the slot lies.

31. A carcass-tracking apparatus comprising:

a transponder package having a surface; and a metallic housing comprising a receiving space configured to receive the transponder package, the housing having a housing surface with a slot disposed therein, the slot being in communication with the receiving space, the transponder package being positioned in the receiving space with the transponder package surface facing the slot, less than an entirety of said transponder package surface disposed directly laterally proximate the slot, wherein the housing comprises a plurality of housing surfaces which lie in planes which define a parallelepiped, and further comprising two other openings in respective housing surfaces which are respectively joined with the receiving space.

32. A carcass-tracking apparatus comprising:

a transponder;

a metallic enclosure dimensioned to receive the transponder within a transponder-receiving space, the enclosure having a surface;

an opening in said surface operably connected with the transponder-receiving space and positioned to accommodate wireless communication with the transponder; and encapsulant material disposed within the transponder-receiving space and covering at least a portion of the transponder, wherein the transponder is fixedly mounted within the transponder-receiving space by the encapsulant material, and further wherein the encapsulant material projects no further than said surface.

33. The carcass-tracking apparatus of claim 32, wherein the opening is elongate.

34. The carcass-tracking apparatus of claim 32, wherein the enclosure has a second surface spaced from the first-mentioned surface, and further comprising an opening in the second surface into the transponder-receiving space.

35. The carcass-tracking apparatus of claim 32, wherein the enclosure has second and third surfaces which are different from the first-mentioned surface, and further comprising respective openings in the second and third surfaces into the transponder-receiving space.

* * * * *

UNITED STATES PATENT AND TRADEMARK OFFICE
CERTIFICATE OF CORRECTION

PATENT NO.    : 6,494,305 B1
DATED         : December 17, 2002
INVENTOR(S)   : Donald L. Black et al.

It is certified that error appears in the above-identified patent and that said Letters Patent is hereby corrected as shown below:

Column 4,
Lines 38 and 39, replace "having a surface 41 (FIG. 6). housing 36, in this embodiment," with -- having a surface 41 (FIG. 6). Housing 36, in this embodiment, --

Column 7,
Line 7, replace "respective directions which are generally 900 away" with -- respective directions which are generally 90° away --
Line 57, replace "wherein the openings lie in:planes which are generally" with -- wherein the openings lie in planes which are generally --

Signed and Sealed this

Twenty-second Day of July, 2003

JAMES E. ROGAN
*Director of the United States Patent and Trademark Office*